United States Patent
Chiang et al.

(10) Patent No.: US 7,757,118 B2
(45) Date of Patent: Jul. 13, 2010

(54) METHOD AND SYSTEM FOR DETECTING AND RECOVERING FAILURE COMMAND

(75) Inventors: Yi-Feng Chiang, Tao Yuan Shien (TW); Ching-Hsiang Chan, Tao Yuan Shien (TW); Ting-Hao Yang, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 461 days.

(21) Appl. No.: 11/987,321

(22) Filed: Nov. 29, 2007

(65) Prior Publication Data

US 2009/0070620 A1   Mar. 12, 2009

(30) Foreign Application Priority Data

Sep. 7, 2007   (TW) ............................... 96133495 A

(51) Int. Cl.
  *G06F 11/00* (2006.01)
(52) U.S. Cl. ........................................................ 714/15
(58) Field of Classification Search ................ 714/2–6, 714/10–12, 15–17, 19, 20, 37, 38, 42, 47, 714/54
See application file for complete search history.

(56) References Cited

U.S. PATENT DOCUMENTS

| | | | | |
|---|---|---|---|---|
| 4,425,615 A | * | 1/1984 | Swenson et al. | 711/114 |
| 7,320,050 B2 | * | 1/2008 | Kobayashi et al. | 711/112 |
| 7,620,747 B1 | * | 11/2009 | Overby et al. | 710/22 |
| 2006/0106980 A1 | * | 5/2006 | Kobayashi et al. | 711/113 |
| 2007/0005896 A1 | * | 1/2007 | Chang et al. | 711/120 |

\* cited by examiner

*Primary Examiner*—Nadeem Iqbal
(74) *Attorney, Agent, or Firm*—Rabin & Berdo, P.C.

(57) ABSTRACT

A method and a system for detecting and recovering a failure command are provided. The method is used in a native command queuing (NCQ) and at least includes the following steps. In step (a), several commands are executed on a disk simultaneously according to the NCQ. In step (b), whether a request time of the commands is longer than a waiting time is measured: if the request time is not longer than the waiting time, then step (a) is executed. In step (c), one command is chosen. In step (d), whether the chosen command is executed successfully is determined: if the chosen command is executed successfully, then step (f) is executed. In step (e), the chosen command is recovered. In step (f), whether all the commands of the NCQ are chosen is determined: if not all the commands are chosen, then another command is chosen and step (d) is repeated.

18 Claims, 4 Drawing Sheets

METHOD AND SYSTEM FOR DETECTING AND RECOVERING FAILURE COMMAND

This application claims the benefit of Taiwan application Serial No. 96133495, filed Sep. 7, 2007, the subject matter of which is incorporated herein by reference.

BACKGROUND OF THE INVENTION

1. Field of the Invention

The invention relates in general to a method and a system for detecting and recovering a failure command, and more particularly to a method and a system for detecting and recovering a failure command for detecting several commands of a native command queuing (NCQ).

2. Description of the Related Art

Storage controller allows many un-executed commands to be executed on a disk simultaneously, and such technology is referred to as native command queuing (NCQ) technology. An NCQ can resort the commands of the disk to optimize the workloads of the disk and increase the accessing efficiency of the disk.

Referring to FIG. 1A and FIG. 1B, FIG. 1A is a perspective of a conventional NCQ system. FIG. 1B is a perspective of another conventional NCQ system. As indicated in FIG. 1A, the conventional NCQ 110a includes a first command 101 and a second command 102, wherein the first command 101 and the second command 102 are waiting to be executed on the disk 100. In the conventional NCQ 110a, if the first command 101 accesses a bad sector of the disk 100 to cause the request time of the commands to be longer than the waiting time, then all the commands of the NCQ 110a will be cancelled. That is, the first command 101 and the second command 102 will not be executed successfully. However, if the first command 101 sends an execution request again and is prioritized in the NCQ 110b with the third command 103 as indicated in FIG. 1B, all the commands of the NCQ 110b will be cancelled to cause both the first command 101 and the third command 103 to fail because the first command 101 still accesses the bad sector of the disk 100.

For the conventional NCQ 110a and 110b, as the first command 101 accesses the bad sector, the second command 102 and the third command 103 can not be executed successfully. Thus the system execution ability is deteriorated. Besides, if the first command 101 again sends an execution request, there will be more commands that can not be executed successfully, hence the reliability and efficiency of the system is decreased.

SUMMARY OF THE INVENTION

The invention is directed to a method and a system for detecting and recovering a failure command. If the request time of the NCQ is longer than the waiting time, then all the commands of the NCQ are executed sequentially and the failure command is recovered.

According to a first aspect of the present invention, a method for detecting and recovering a failure command is provided. The method used in an NCQ includes at least the following steps. In step (a), several commands are executed simultaneously on a disk according to the NCQ. In step (b), whether a request time of the commands is longer than a waiting time is measured: if the request time is not longer than the waiting time, then step (a) is executed. In step (c), one of the commands is chosen. In step (d), whether the chosen command is executed successfully is determined: if the chosen command is executed successfully, then step (f) is executed. In step (e), the chosen command is recovered. In step (f), whether all the commands of the NCQ have been chosen is determined: if not all the commands have been chosen, then another command is chosen and step (d) is repeated.

According to a second aspect of the present invention, a system for detecting and recovering a failure command is provided. The system includes an NCQ and a processing unit. The NCQ has several commands to be executed on a disk. The processing unit includes a first determining unit, a choosing unit, a second determining unit, a third determining unit and a recovering unit. The first determining unit is used for determining whether a request time of the commands is longer than a waiting time. The choosing unit is used for choosing one of the commands. The second determining unit is used for determining whether the chosen command is executed successfully. The third determining unit is used for determining whether the choosing unit has chosen all the commands. The recovering unit is used for recovering a failure command. If the request time of the commands is not longer than the waiting time, the commands are executed simultaneously by the disk. If the request time of the commands is longer than the waiting time, the command chosen by the choosing unit is executed by the disk. If the chosen command is executed successfully, the choosing unit decides whether another command is chosen from the commands according to the determination of the third determining unit. If the chosen command is executed and failed, the recovering unit recovers the chosen command and the choosing unit decides whether another command is chosen from the commands according to the determination of the third determining unit. The choosing unit chooses the commands sequentially until all the commands have been chosen.

The invention will become apparent from the following detailed description of the preferred but non-limiting embodiments. The following description is made with reference to the accompanying drawings.

DETAILED DESCRIPTION OF THE INVENTION

Figure 1A:
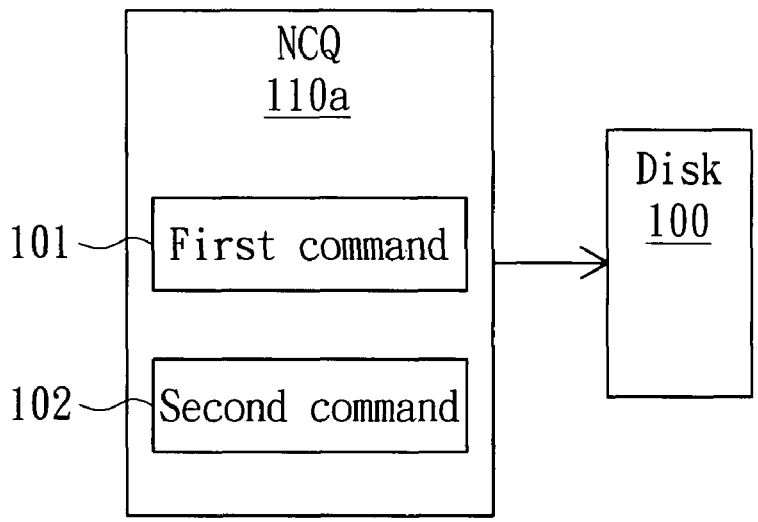
FIG. 1A is a perspective of a conventional NCQ system.
Figure 1B:
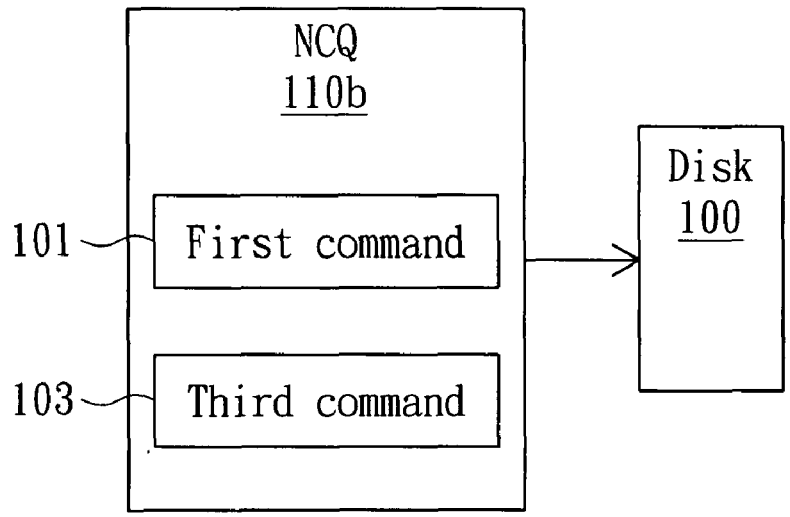
FIG. 1B is a perspective of another conventional NCQ system.
Figure 2:
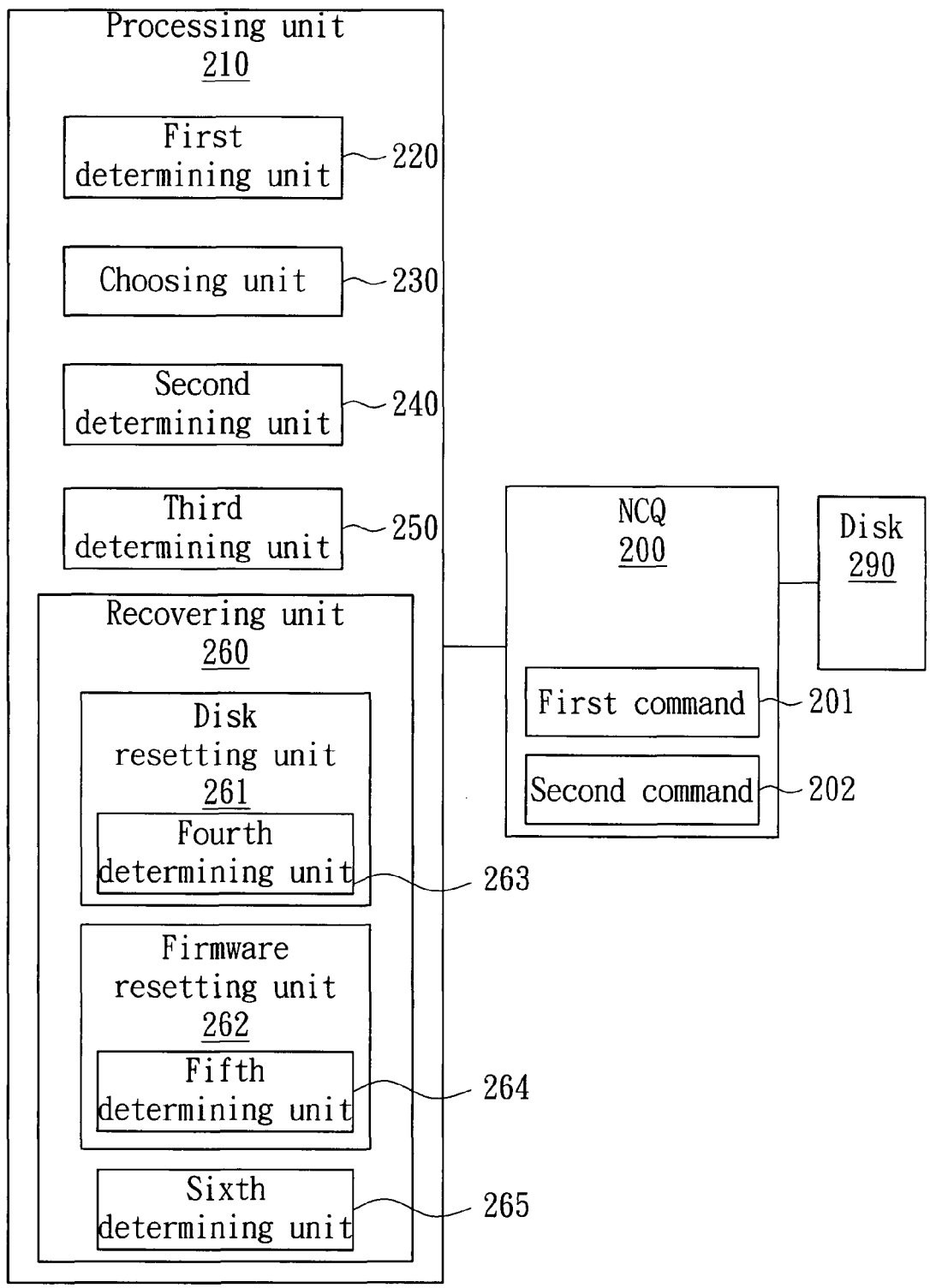
FIG. 2 is a perspective of a system for detecting and recovering a failure command according to a preferred embodiment of the invention.

Referring to FIG. 2, a perspective of a system for detecting and recovering a failure command according to a preferred embodiment of the invention is shown. The system for detecting and recovering a failure command includes an NCQ 200 and a processing unit 210. The NCQ 200 has several commands to be executed on the disk 290, e.g. a serial advanced technology attachment (SATA) disk. In the present embodiment of the invention, the commands include a first command 201 and a second command 202. The processing unit 210 includes a first determining unit 220, a choosing unit 230, a second determining unit 240, a third determining unit 250 and a recovering unit 260.

The first determining unit 220 is used for determining whether the request time of the first command 201 and the second command 202 is longer than a pre-determined waiting time. The first determining unit 220 is exemplified by a timer. The choosing unit 230 is used for choosing one of the first command 201 and the second command 202. The second determining unit 240 is used for determining whether the command chosen by the choosing unit 230 is executed successfully. The third determining unit 250 is used for determining whether the choosing unit 230 has chosen all the commands of the NCQ 200. The recovering unit 260 is used for recovering a failure command.

If the first determining unit 220 determines that the request time of the first command 201 and the second command 202 is not longer than the waiting time, then the first command 201 and the second command 202 are executed simultaneously on the disk 290. If the first determining unit 220 determines that the request time of the first command 201 and the second command 202 is longer than the waiting time, then the choosing unit 230 chooses one command from the first command 201 and the second command 202. Besides, only the chosen command is executed on the disk 290. If the chosen command is executed successfully, then the choosing unit 230 decides whether another command from the first command 201 and the second command 202 is chosen according to the determination of the third determining unit 250. If the chosen command is not executed successfully, then the chosen command is recovered by the recovering unit 260. After that, whether another command from the NCQ 200 is chosen is decided according to the determination of the third determining unit 250. The choosing unit 230 sequentially chooses one command from the commands of the NCQ 200 until all the commands have been chosen.

According to the system for detecting and recovering a failure command of the preferred embodiment of the invention, if the request time of the NCQ 200 is longer than the waiting time, then one of the commands is chosen by the choosing unit 230 and executed until all the commands of the NCQ 200 have been chosen and executed. Thus, the disadvantages of low reliability and low efficiency caused by the unsuccessful commands in the conventional NCQ system are avoidable.

Besides, the system for detecting and recovering a failure command preferably includes a second NCQ (not illustrated). If all the commands of the NCQ 200 have been executed, then the system for detecting and recovering a failure command executes several commands of the second NCQ.

Moreover, the choosing unit 230 preferably chooses one of the commands orderly according to the sequence in the NCQ 200 for reducing the rotating latencies and the seeking latencies of the head of the disk 290.

Furthermore, if the second determining unit 240 determines that the command chosen by the choosing unit 230 is not executed successfully, then the command is recovered by the recovering unit 260. That the command can not be executed successfully is probably resulted from the failure in accessing the sector of the disk 290. Therefore, the recovering unit 260 preferably includes a disk resetting unit 261 for restarting the disk 290. The disk resetting unit 261 preferably includes a fourth determining unit 263 for determining whether the disk 290 is restarted.

That the command can not be executed successfully is probably resulted from the error in the firmware (not illustrated) of the disk 290. Therefore, the recovering unit 260 preferably includes a firmware resetting unit 262 for restarting the firmware. In the present embodiment of the invention, the firmware is used in a serial advanced technology attachment (SATA) adapter. Moreover, the firmware resetting unit 262 preferably includes a fifth determining unit 264 for determining whether the firmware is restarted.

In the present embodiment of the invention, the recovering unit 260 preferably further includes a sixth determining unit 265 for determining whether the failure command is a read command or a write command. If the failure command is a command for reading the contents from a sector, then the disk 290 writes the contents of the sector into a spare area. If another command accesses the contents from the sector, then the disk 290 remaps the head onto the spare area for accessing the contents. If the failure command is a command for writing contents to a sector, then the disk 290 is disabled.

Figure 3:
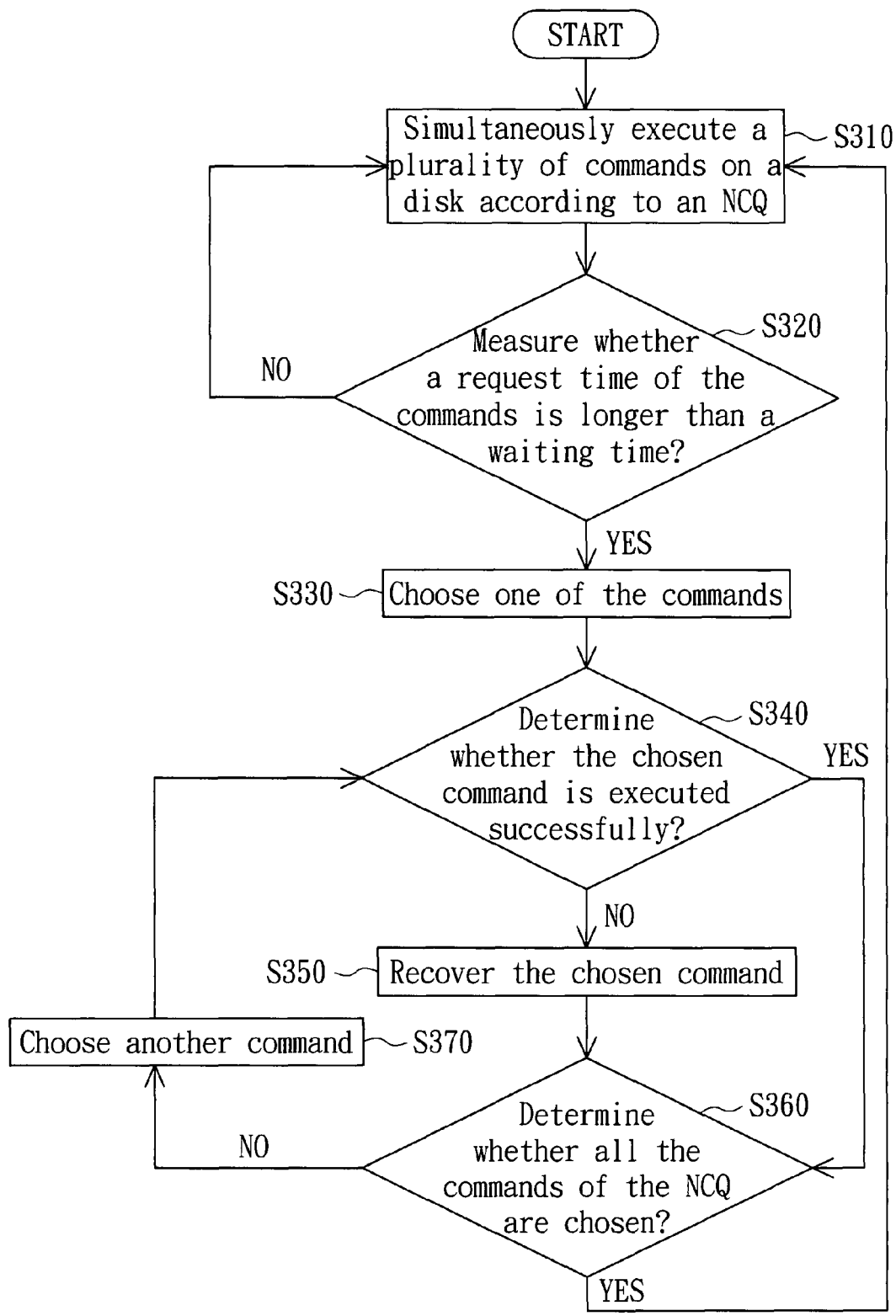
FIG. 3 is a flowchart of a method for detecting and recovering a failure command according to a preferred embodiment of the invention.

The method for detecting and recovering a failure command is disclosed below with accompanied drawings. Referring to FIG. 3, a flowchart of a method for detecting and recovering a failure command according to a preferred embodiment of the invention is shown. Also, please refer to the designations of the elements of FIG. 2. The method for detecting and recovering a failure command is used for detecting several commands of the NCQ 200. In the present embodiment of the invention, the NCQ 200 includes a first command 201 and a second command 202.

The method for detecting and recovering a failure command includes at least following steps. Firstly, the method begins at step S310, the first command 201 and the second command 202 are executed simultaneously on the disk 290 according to the NCQ 200.

Next, the method proceeds to step S320, whether the request time of the first command 201 and the second command 202 is longer than a pre-determined waiting time is measured by the first determining unit 220. If the request time is not longer than the waiting time, then step S310 is executed. If the request time is longer than the waiting time, then step S330 is executed. In the present embodiment of the invention, it is assumed that the first command 210 accesses a bad sector so that the disk 290 is not able to response the request of the first command 201. Hence, the request time is longer than the waiting time, and step S330 is executed.

Then, the method proceeds to step S330, the choosing unit 230 chooses one command from the first command 201 and the second command 202 according to the NCQ 200. It is assumed the first command 201 is chosen here.

Afterwards, the method proceeds to step S340, whether the first command 201 is executed successfully is determined by the second determining unit 240. If the first command 201 is not executed successfully, then step S350 is executed. If the first command 201 is executed successfully, then step S360 is executed. In the present embodiment of the invention, as the first command 201 is a command which accesses a bad sector and can not be executed successfully, step S350 is executed.

Then, the method proceeds to step S350, the first command 201 is recovered by the recovering unit 260.

After that, the method proceeds to step S360, whether all the commands of the NCQ 200 have been chosen is determined by the third determining unit 250. If not all the commands are chosen, then step S370 is executed. As the second command 202 of the NCQ 200 has not been chosen yet, step S370 is executed.

Then, the method proceeds to step S370, another command is chosen from the NCQ 200 by the choosing unit 230 and step S340 is repeated. As the second command 202 has not yet been chosen, the second command 202 is chosen by the choosing unit 230 and step S340 is repeated.

The method for detecting and recovering a failure command is based on the request time of several commands of the NCQ. If the request time is longer than the waiting time, then the commands are executed respectively and the failure commands are recovered. Thus, the disadvantages of low reliability and low efficiency in a conventional NCQ is avoidable.

In the present embodiment of the invention, when the second command 202 is chosen by the choosing unit 230 and step S340 is executed, as the second determining unit 240 determines that the second command 202 is executed successfully, step S360 is executed. Preferably, step S310 is repeated according to another NCQ (not illustrated) after all the commands of the NCQ 200 have been chosen, thereby it is assured that all the commands of the NCQ 200 are checked.

In the present embodiment of the invention, the choosing unit 230 preferably chooses one command orderly according to the sequence in the NCQ 200, hence the rotating latencies and the seeking latencies of the head of the disk 290 can be reduced.

Figure 4:
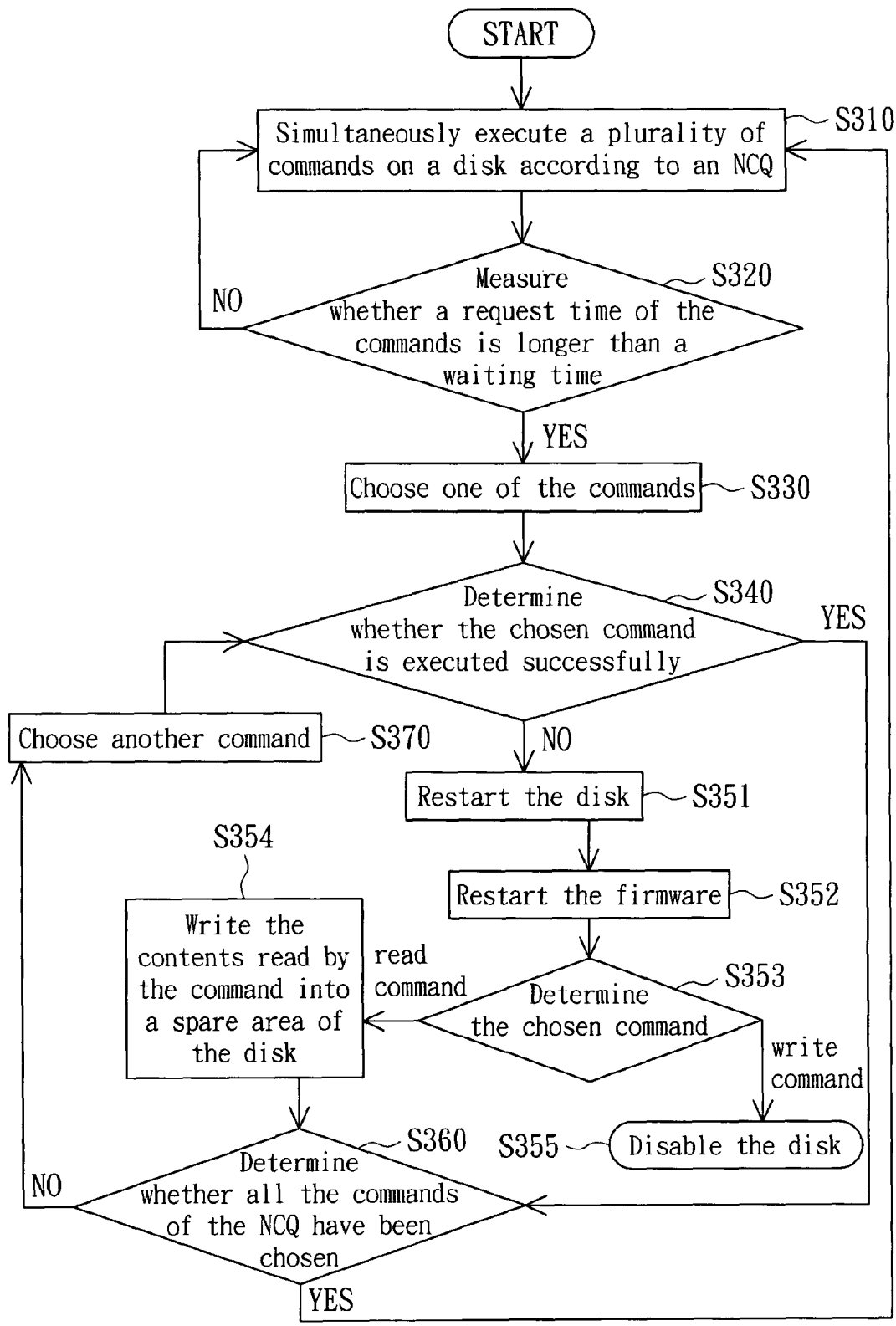
FIG. 4 is a detailed flowchart of the method for detecting and recovering a failure command of FIG. 3.

Referring to FIG. 4, a detailed flowchart of the method for detecting and recovering a failure command of FIG. 3 is shown. In the step S340 of FIG. 3, if the chosen command is not executed successfully, then step S350 of FIG. 4 is executed. Here, let the to-be-recovered command be the first command 201.

Firstly, step S351 is executed, the disk 290 is restarted by the disk resetting unit 261. That the first command 201 can not be executed successfully is probably due to the failure in accessing the sector of the disk 290, so the disk 290 is restarted. The disk 290, once restarted, preferably does not need to be restarted again.

Next, step S352 is executed, the firmware used in the disk 290 is restarted by the firmware resetting unit 262. The firmware used in the disk 290 could have error and cause the first command 201 to fail, so the firmware is restarted. The firmware, once restarted, preferably does not need to be restarted again.

Then, step S353 is executed, the command type of the first command 201 is determined by the sixth determining unit 265. If the first command 201 is a read command, then step S354 is executed. If the first command 201 is a write command, then step S355 is executed.

In step S354, the disk 290 writes the contents of the sector read by the first command 201 into a spare area. Therefore, when another command accesses the contents of the sector, the disk 290 remaps the head to the spare area.

In step S355, if the first command 201 is a write command, then the disk 290 is disabled.

The above-mentioned steps S351~S355 are not for limiting the embodiment modes of step S350. It is allowed that only one or a part of steps S351~S355 is embodied. Preferably, whether the chosen command is executed successfully is determined by the second determining unit 240 after step S351, step S352, step S354 and step S355 respectively. If the chosen command is executed successfully, then step S360 is executed.

According to the method and the system for detecting and recovering a failure command disclosed in above embodiment of the invention, when the request time of the NCQ is longer than the waiting time, all the commands of the NCQ are executed sequentially so that the failure command is discovered and recovered. Besides, other commands of the NCQ can be executed successfully by executing them respectively. Therefore, the invention at least has the advantages of increasing reliability, efficiency and the correct rate of executing the disk.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for detecting and recovering a failure command, wherein the method is used in a native command queuing (NCQ) and comprises the following steps of:
   (a) simultaneously executing a plurality of commands on a disk according to the NCQ;
   (b) measuring whether a request time of the commands is longer than a waiting time: if the request time is not longer than the waiting time, then the step (a) is executed;
   (c) choosing one of the commands;
   (d) determining whether the chosen command is executed successfully: if so, then the step (f) is executed;
   (e) recovering the chosen command; and
   (f) determining whether all the commands of the NCQ have been chosen: if not, then another command is chosen and the step (d) is repeated.

2. The method for detecting and recovering a failure command according to claim 1, wherein in the step (f), if all the commands have been chosen, then the step (a) is repeated according to another NCQ.

3. The method for detecting and recovering a failure command according to claim 1, wherein in the step (f), if not all the commands have been chosen, then another command is chosen orderly and the step (d) is repeated.

4. The method for detecting and recovering a failure command according to claim 1, wherein the step (e) further comprises:
   (e-1) restarting the disk.

5. The method for detecting and recovering a failure command according to claim 4, wherein the step (e-1) further comprises:
   (e-1-1) restarting the disk if the disk has not been restarted.

6. The method for detecting and recovering a failure command according to claim 1, wherein the step (e) further comprises:
   (e-2) restarting a firmware used in the disk.

7. The method for detecting and recovering a failure command according to claim 6, wherein the step (e-2) further comprises:
   (e-2-1) restarting the firmware if the firmware has not been restarted.

8. The method for detecting and recovering a failure command according to claim 1, wherein the step (e) further comprises:
   (e-3) determining the chosen command: if the chosen command is a read command, then the step (e-4) is executed, and if the chosen command is a write command, then the step (e-5) is executed;
   (e-4) writing the contents read by the command into a spare area of the disk; or
   (e-5) disabling the disk.

9. The method for detecting and recovering a failure command according to claim 1, wherein the disk is a serial advanced technology attachment (SATA) disk.

10. A system for detecting and recovering a failure command, the system comprising:
    an NCQ having a plurality of commands to be executed on a disk; and
    a processing unit, comprising:
      a first determining unit used for determining whether a request time of the commands is longer than a waiting time;

a choosing unit used for choosing one of the commands;

a second determining unit used for determining whether the chosen command is executed successfully;

a third determining unit used for determining whether all the commands have been chosen by the choosing unit; and a recovering unit used for recovering a failure command;

wherein if the request time of the commands is not longer than the waiting time, then the commands are executed simultaneously by the disk; if the request time of the commands is longer than the waiting time, then the command chosen by the choosing unit is executed by the disk; if the chosen command is executed successfully, then the choosing unit decides whether another command is chosen from the commands according to the determination of the third determining unit; if the chosen command is executed and failed, then the recovering unit recovers the chosen command and the choosing unit decides whether another command is chosen from the commands according to the determination of the third determining unit;

wherein the choosing unit chooses one command from the commands sequentially until all the commands have been chosen.

11. The system for detecting and recovering a failure command according to claim 10, further comprising:

another NCQ, wherein if the choosing unit has chosen all the commands of the NCQ, then another plurality of commands are executed on the disk according to another NCQ.

12. The system for detecting and recovering a failure command according to claim 10, wherein the choosing unit chooses one command from the commands orderly.

13. The system for detecting and recovering a failure command according to claim 10, wherein the recovering unit further comprises:

a disk resetting unit used for restarting the disk.

14. The system for detecting and recovering a failure command according to claim 13, wherein the disk resetting unit further comprises:

a fourth determining unit used for determining whether the disk is restarted.

15. The system for detecting and recovering a failure command according to claim 10, wherein the recovering unit further comprises:

a firmware resetting unit used for restarting a firmware applied to the disk.

16. The system for detecting and recovering a failure command according to claim 15, wherein the firmware resetting unit further comprises:

a fifth determining unit used for determining whether the firmware is restarted.

17. The system for detecting and recovering a failure command according to claim 10, wherein the recovering unit further comprises:

a sixth determining unit used for determining the information of the chosen command;

wherein if the chosen command is a read command, then the disk writes the contents read by the command into a spare area of the disk; if the command is a write command, then the disk is disabled.

18. The system for detecting and recovering a failure command according to claim 10, wherein the disk is a serial advanced technology attachment (SATA) disk.

* * * * *